(12) United States Patent
Rota Martir et al.

(10) Patent No.: US 6,858,803 B2
(45) Date of Patent: Feb. 22, 2005

(54) FACEPLATE FOR AN ELECTRICAL SWITCHBOARD

(75) Inventors: Roberto Rota Martir, Brembate di Sopra (IT); Stefano Besana, Terno d'Isola (IT)

(73) Assignee: ABB Service S.r.l. (IT)

( * ) Notice: Subject to any disclaimer, the term of this patent is extended or adjusted under 35 U.S.C. 154(b) by 0 days.

(21) Appl. No.: 10/333,788

(22) PCT Filed: Jul. 20, 2001

(86) PCT No.: PCT/EP01/08463
§ 371 (c)(1),
(2), (4) Date: Jan. 24, 2003

(87) PCT Pub. No.: WO02/09248
PCT Pub. Date: Jan. 31, 2002

(65) Prior Publication Data
US 2003/0150636 A1 Aug. 14, 2003

(30) Foreign Application Priority Data
Jul. 24, 2000 (IT) .................................. MI2000A1687

(51) Int. Cl.$^7$ ................................................ H02G 3/14
(52) U.S. Cl. ............................ 174/66; 174/67; 220/241
(58) Field of Search ..................... 174/66, 67; 220/241, 220/242

(56) References Cited

U.S. PATENT DOCUMENTS 4,737,599 A * 4/1988 Fontaine ...................... 174/67

* cited by examiner

*Primary Examiner*—Dhiru R. Patel
(74) *Attorney, Agent, or Firm*—Connolly, Bove, Lodge & Hutz LLP

(57) ABSTRACT

A faceplate for an electrical switchboard, a body which has a substantially quadrangular shape and is provided with an opening to accommodate at least part of an electrical and/or electronic device of the switchboard, said faceplate being suitable to be operatively couples to a window provided on a plate, characterized in that said body has connection means for coupling to the plate, at the edges of said window, in a movable and adjustable manner with respect to the plate itself.

17 Claims, 3 Drawing Sheets

FACEPLATE FOR AN ELECTRICAL SWITCHBOARD

BACKGROUND OF THE INVENTION

The present invention relates to a faceplate for an electrical switchboard having improved functions and characteristics.

It is known that low-voltage industrial electrical systems which handle high-level currents, and therefore high power levels, usually use specific devices which are commonly known in the art as automatic power circuit breakers.

These automatic circuit breakers are meant to provide the performance required to ensure the correct operation of the electric power supply circuit that they protect and of the loads connected thereto. In particular, they protect the loads against abnormal events caused for example by failures arising from short circuits or overloads by automatically opening said power supply circuit; they allow the correct connection/disconnection of loads to/from the electric power supply circuit; they ensure that the nominal current for the various connected users is actually equal to the required current; they allow, by way of a manual intervention on an actuation lever of said circuit breaker and the associated separation of the moving contacts from the fixed contacts, the complete insulation of a load with respect to a power supply source and the consequent disconnection of the circuit that they protect.

In practical use in electrical systems, automatic circuit breakers are generally used by arranging them in appropriately provided electrical switchboards, typically electrical distribution switchboards. These switchboards, according to solutions which are widely known in the art, use a supporting frame which bounds a volume in which the circuit breakers and any other electrical and/or electronic devices of the switchboard are placed; furthermore, said frame constitutes a skeleton which is suitable to structurally support the various components of the switchboard that are functionally connected thereto, such as guides or supporting plates on which the circuit breakers and the various devices are arranged, cladding plates, doors for opening/closing said switchboards, et cetera.

In particular, the switchboards are provided with appropriate inspection doors which are functionally connected to the frame and are provided with suitable windows which allow to view and access the elements for controlling the circuit breakers and any other devices that are present.

In the current state of the art, the solutions used to provide the doors and the modes for coupling to the devices have some drawbacks. In order to ensure correct coupling between the devices and the door, adequate functionality of the parts, safety and practicality in use, as well as a pleasant aesthetic appearance of the assembly, the doors require blanking operations with highly precise carpentry work; essentially, they require complicated and expensive production processes.

In order to obviate these drawbacks at least partially, faceplates or escutcheons are fixed along the edges of the windows of the doors and are provided with openings which are suitable to accommodate the front part of a circuit breaker or of another device. The fixing of said faceplates, however, requires additional work for providing, around the window, appropriate fixing holes which are suitable to accommodate screws or tangs for interlocking. Furthermore, since said fixing is currently based on rigid couplings, it is a particularly critical aspect of the installation. Even slight inaccuracies can in fact entail degradation of one or all of the required functions; in such situations it is therefore necessary to resort to expensive manual interventions or even replace the entire door affected by the installation inaccuracy and reject it, with the consequent financial damage.

BRIEF SUMMARY OF THE INVENTION

The aim of the present invention is to provide a faceplate for an electrical switchboard which allows to obviate the drawbacks of the prior art and particularly allows to facilitate significantly the operations for coupling to the door of the switchboard and to the corresponding electrical device while ensuring the precision and functional effectiveness of said coupling.

Within this aim, an object of the present invention is to provide a faceplate for an electrical switchboard which allows to reduce and simplify the process steps required for its execution and subsequent use, ensuring a high quality standard and eliminating the need for additional interventions for correcting its construction.

Another object of the present invention is to provide a faceplate for an electrical switchboard which allows to eliminate or at least reduce significantly production rejects arising from inaccurate construction.

Another object of the present invention is to provide a faceplate for an electrical switchboard which is highly reliable, relatively easy to manufacture and at competitive costs.

This aim and these and other objects which will become better apparent hereinafter are achieved by a faceplate for an electrical switchboard, comprising a body which has a substantially quadrangular shape and is provided with an opening to accommodate at least part of an electrical and/or electronic device of the switchboard, said faceplate being suitable to be operatively coupled to a window provided on a plate, characterized in that said body has connection means for coupling to the plate, at the edges of said window, in a movable and adjustable manner with respect to the plate itself.

Advantageously, the faceplate according to the invention allows to adjust its position with respect to the plate to which it is coupled directly during assembly; in this manner it is possible to compensate for any slacks with respect to the plate and the device without having to resort to complicated production steps, as regards both the faceplate and the plate, or to expensive and complicated corrective interventions after manufacture. Furthermore, the coupling between the faceplate and the plate is provided in an extremely simple and rapid manner, allowing to reduce installation times and costs.

Further characteristics and advantages of the present invention will become better apparent from the description of some preferred but not exclusive embodiments of a faceplate for an electrical switchboard according to the invention, illustrated only by way of non-limitative example in the accompanying drawings, wherein:

BRIEF DESCRIPTION OF THE INVENTION

With reference to the above cited figures, the faceplate for an electrical switchboard according to the invention comprises a substantially flat body 1 which, seen in plan view, is substantially quadrangular. In particular, in the embodiment shown in FIG. 1, the body 1 is rectangular; alternatively, according to the applications or to specific requirements, the shape of the body 1 can be modified appropriately so that it is for example square.

Figure 1A:
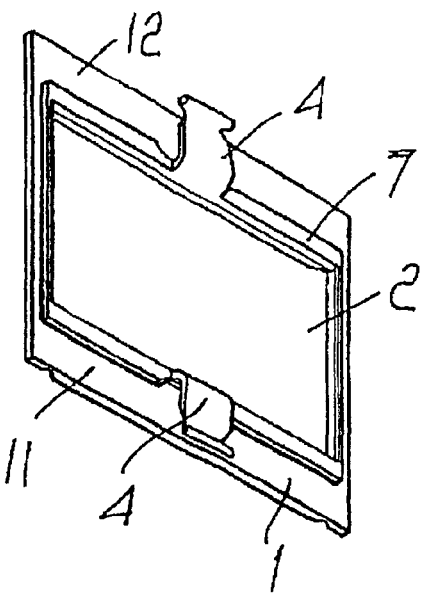
FIGS. 1a and 1b are perspective views of, respectively, the rear and front parts of a faceplate for an electrical switchboard according to the invention.
Figure 1B:
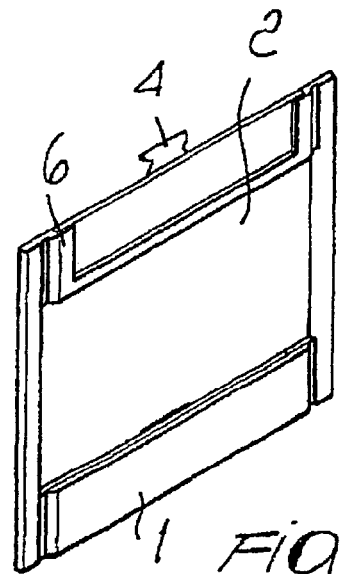
Figure 5:
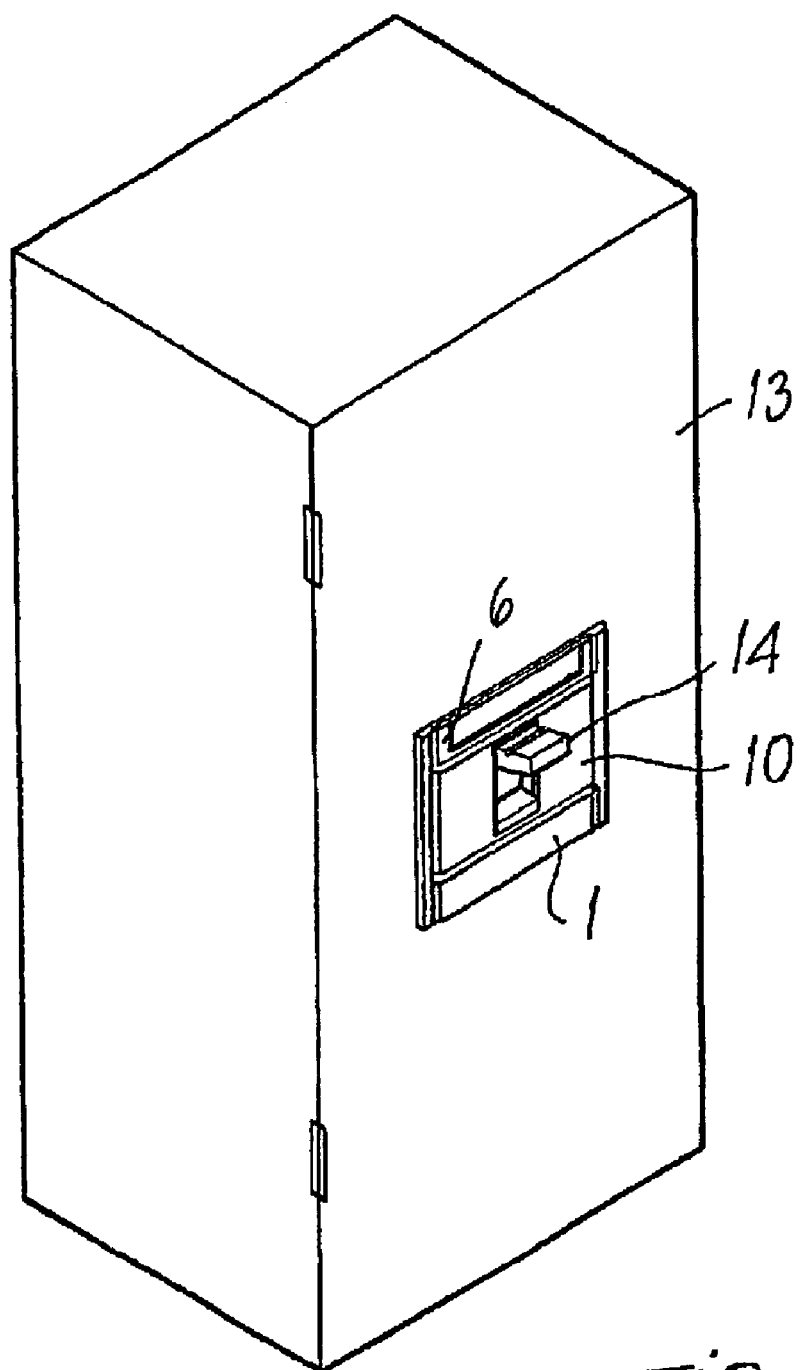
FIG. 5 is a perspective view of an electrical switchboard with a faceplate according to the invention, coupled to an automatic circuit breaker.

In the body 1, in a substantially centered position, there is provided an opening 2 which can accommodate at least part of an electrical and/or electronic device of the switchboard, in the manner described in detail hereinafter; as shown in FIG. 1, the opening 2 can have a rectangular shape or can be configured differently according to the geometric shape of the device or devices to which it is meant to be coupled. Said devices can be constituted, for example, by an automatic circuit breaker 10, as shown in FIG. 5, or by buttons, PLC's (Programmable Logic Controllers), instruments for controlling and/or monitoring machines, et cetera.

Figure 4:
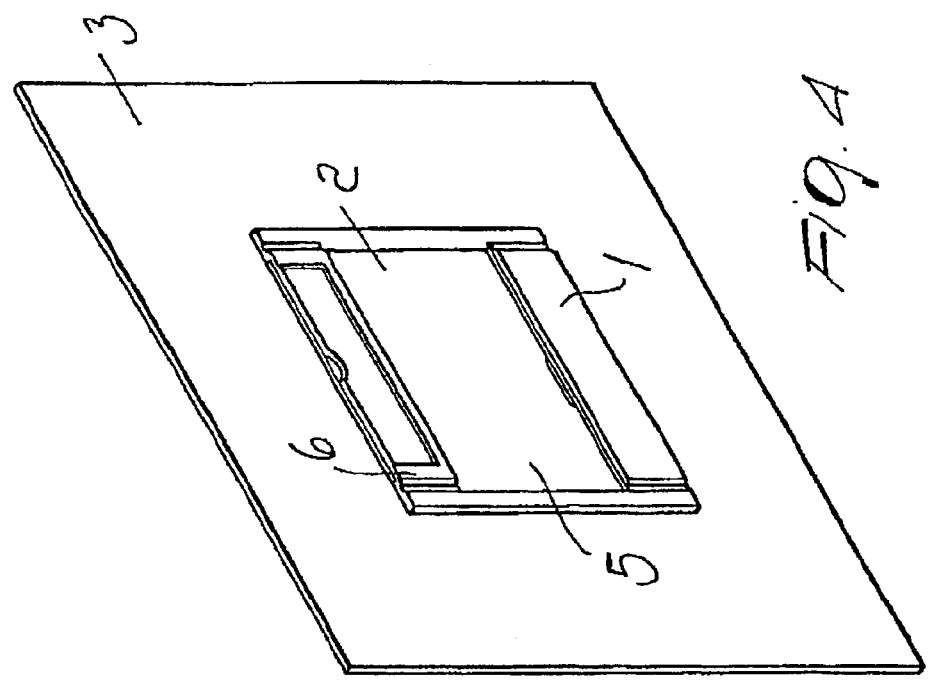
FIG. 4 is a perspective view of the faceplate according to the invention, coupled to a plate of an electrical switchboard.
Figure 3:
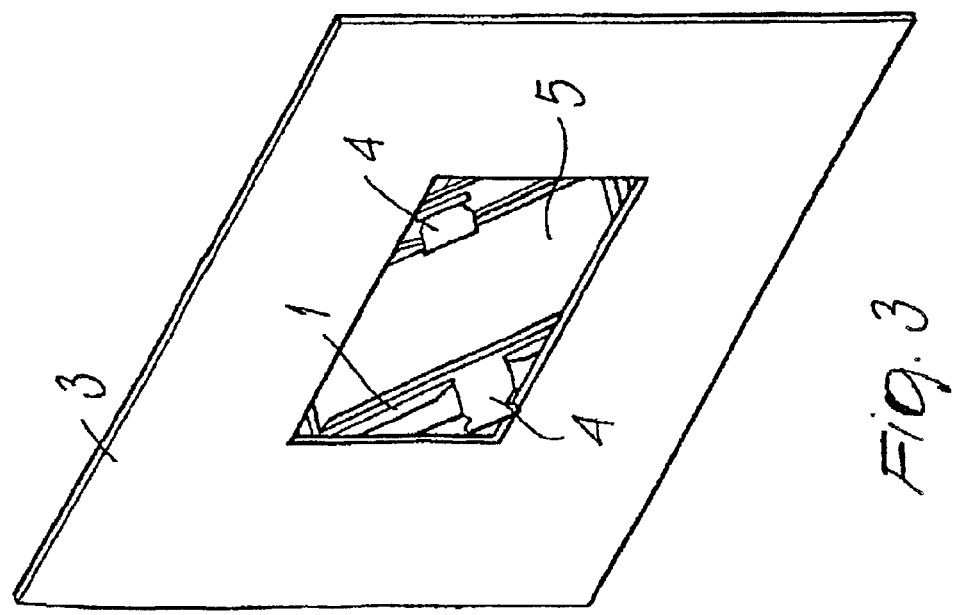
FIG. 3 is a perspective view of a faceplate according to the invention during coupling to a plate of an electrical switchboard.

Advantageously, on the body 1 of the faceplate there are provided connection means which are suitable to facilitate its coupling to a plate 3 so that it can move with respect to said plate and their mutual position can be adjusted; as shown in FIGS. 3 and 4, the plate 3, which is in practice a protective panel or an inspection door of the switchboard, has a window 5 which facilitates coupling to the faceplate in the manner described hereinafter.

Figure 2:
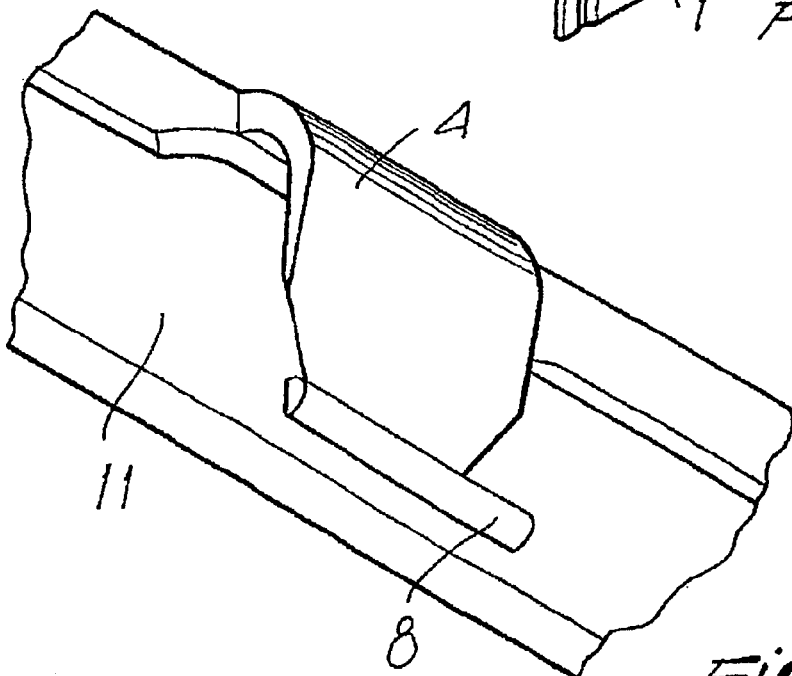
FIG. 2 is a perspective view of a detail of the coupling means formed in the faceplate of FIG. 1.

The connection means provided on the body 1 comprise at least one hook 4 which is suitable to mate geometrically with one of the walls of the plate 3 that delimit the window 5; in particular, as shown in detail in FIG. 2, the hook 4 has a first base portion, which has a substantially curved lateral cross-section and protrudes from a wall 11 of the body 1 transversely to a reference plane on which the opening 2 lies, and a second portion, which is structurally continuous with respect to the first portion, has a variable thickness and is directed away from the opening 2 in the direction in which the wall 11 is arranged and at a certain distance from said wall. Finally, the second portion ends with a contoured head 8 which is suitable to increase the mechanical strength of the hook and facilitate guiding and coupling with the corresponding wall of the window 5. Advantageously, the hook 4 thus conceived has a flexible structure which allows to couple it easily to walls of plates or panels of different thickness.

In a preferred embodiment of the faceplate according to the invention, and as shown in detail in FIGS. 1 and 3, on the body 1 there are provided two flexible hooks 4 arranged on two walls 11 and 12 which are mutually opposite with respect to the opening 2; furthermore, the two hooks 4 are orientated in mutually opposite directions with respect to the opening 2 and are arranged along the corresponding walls 11 and 12 in a substantially centered position. This arrangement of the hooks 4 allows to move the faceplate with respect to the plate 3 along a first axis, which is orientated like the line that connects the two hooks 4, and along a second axis, which is perpendicular to the first one, in both directions.

Furthermore, a protruding edge 7 is formed perimetrically along the edges of the opening 2, which protrudes transversely with respect to said opening 2 on the same side on which the hooks 4 are arranged, and is suitable to interact geometrically with the walls that delimit the window 5 and to facilitate centering between said window 5 and the opening 2.

Finally, a pocket 6 is formed in one of the walls of the body 1, for example the wall 11, and on the opposite side with respect to the one where the hooks 4 are provided; said pocket is suitable to accommodate means, for example an indicator plate, for direct and immediate identification of the device 10 that is accommodated in the opening 2.

In practice, during assembly the faceplate is coupled to the plate 3 by arranging it so that the hooks 4 are arranged diagonally with respect to the window 5, as shown in FIG. 3; then the faceplate is turned, moving the hooks 4 so that they couple to the corresponding walls of the plate 3 and so that the opening 2 becomes aligned with the window 5. The assembly constituted by the plate and the faceplate is then moved into the final position, shown in FIG. 5, in which the circuit breaker 10 partially enters the opening 2. Said operation can be performed, for example, by turning the plate 3 about its pivoting axis on the frame of the switchboard, or on appropriate connection means which functionally connect the plate to said frame. Finally, a door 13 of the switchboard is closed so that a knob 14 of the circuit breaker protrudes from the plate 3 through the opening 2, allowing an operator to view it and, where necessary, intervene directly thereon.

In practice it has been found that the frame for electrical switchboard according to the invention fully achieves the intended aim and objects, allowing a significant series of advantages with respect to the known art.

In particular, thanks to the presence of the pair of hooks, a movable mutual coupling is provided between the plate and the faceplate and allows, during assembly, to adjust the position of the faceplate with respect to the plate on a plane which is substantially parallel to the reference plane which contains said plate. Accordingly, this allows to obviate simply and effectively any constructive inaccuracies and any clearance between the plate and the faceplate and between the edges of the opening and the walls of the device, giving the assembly a pleasant aesthetic effect while ensuring the view of the device and direct access to its control elements. This provides the additional advantage of fully eliminating, or at least reducing significantly with respect to the prior art, production rejects and any corrective actions after production, and of simplifying said production steps.

In addition to this, the great ease with which the faceplate couples to the plate allows to reduce installation times and costs, also thanks to the fact that the operations for providing holes in the panel and for subsequently fixing screws or tangs for engaging the faceplate are fully eliminated.

The fact should not be ignored that all the innovative functions and inventive aspects of the faceplate can be obtained by using commonly commercially available elements and materials with extremely modest costs and according to a solution which is constructively simple and functionally effective; for example, the faceplate can be made of conventional plastic or metallic materials.

The faceplate thus conceived is susceptible of numerous modifications and variations, all of which are within the scope of the inventive concept; for example, depending on the applications, the dimensions of the faceplate and of its opening might be conveniently modified so as to accommodate more than one electrical and/or electronic device of the switchboard. All the details may furthermore be replaced with technically equivalent elements. In practice, the materials used, so long as they are compatible with the specific use, as well as the shapes and the dimensions, may be any according to requirements and the state of the art.

What is claimed is:

1. A faceplate for an electrical switchboard, the faceplate comprising a body which has a substantially quadrangular shape and includes an opening to accommodate at least part of an electrical or electronic device of the switchboard, the faceplate being suitable to be operatively coupled to a window provided on a plate, wherein the body has connection means comprising at least one hook for coupling the faceplate to the plate at edges of the window such that the faceplate is movable and adjustable with respect to the plate, and wherein the at least one hook protrudes from a wall of the body transversely to a reference plane on which the opening lies.

2. The faceplate according to claim 1, said at least one hook is suitable to allow coupling to the plate in a position which is adjustable on a plane substantially parallel to a reference plane on which said plate lies.

3. The faceplate according to claim 2, wherein a pocket is formed in wall of said body, on a side opposite to a side from which the at least one hook protrudes, said pocket being suitable to accommodate means for identifying the electrical or electronic device.

4. The faceplate according to claim 1, wherein said at least one hook comprises a first portion, which has a substantially curved lateral cross-section and protrudes from an edge of said opening, and a second portion, which is structurally continuous with respect to the first portion, lies parallel to a direction of extension of said wall, is spaced from said wall and is directed away from said opening.

5. The faceplate according to claim 4, wherein said second portion ends with a contoured head which is suitable to mechanically stiffen the at least one hook and facilitate coupling the at least one hook to a corresponding edge of the window.

6. The faceplate according to claim 5, wherein said at least one hook is flexible.

7. The faceplate according to claim 5, wherein said at least one hook comprises two hooks which are arranged on the body on mutually opposite sides with respect to the opening and are orientated in opposite directions.

8. The faceplate according to claim 4, wherein said at least one hook is flexible.

9. The faceplate according to claim 4, wherein said at least one hook comprises two hooks which are arranged on the body on mutually opposite sides with respect to the opening and are orientated in opposite directions.

10. The faceplate according to claim 4, wherein a pocket is formed in a wall of said body, on a side opposite to a side from which the at least one hook protrudes, said pocket being suitable to accommodate means for identifying the electrical or electronic device.

11. The faceplate according to claim 1, wherein said hook is flexible.

12. The faceplate according to claim 11, wherein said at least one hook comprises two hooks which are arranged on the body on mutually opposite sides with respect to the opening and are orientated in opposite directions.

13. The faceplate according to claim 1, wherein said at least one hook comprises two hooks which are arranged on the body on mutually opposite sides with respect to the opening and are orientated in opposite directions.

14. The faceplate according to claim 13, wherein the two hooks are arranged on two opposite walls of the body in a position which is centered with respect to the opening.

15. An electrical switchboard comprising the faceplate of claim 1.

16. A faceplate for an electrical switchboard, the faceplate comprising a body which has a substantially quadrangular shape and includes an opening to accommodate at least part of an electrical or electronic device of the switchboard, the faceplate being suitable to be operatively coupled to a window provided on a plate, wherein the body has connection means comprising at least one hook for coupling the faceplate to the plate at edges of the window such that the faceplate is movable and adjustable with respect to the plate, wherein a pocket is formed in a wall of the body, on a side opposite to a side from which the at least one hook protrudes, the pocket being suitable to accommodate means for identifying the electrical or electronic device.

17. A faceplate for an electrical switchboard, the faceplate comprising a body which has a substantially quadrangular shape and includes an opening to accommodate at least part of an electrical or electronic device of the switchboard, the faceplate being suitable to be operatively coupled to a window provided on a plate, wherein the body has connection means for coupling the faceplate to the plate at edges of the window such that the faceplate is movable and adjustable with respect to the plate, wherein a protruding edge is formed along edges of the opening and wherein the protruding edge protrudes transversely to the opening, the protruding edge being suitable to interact geometrically with walls of the window and to facilitate centering of the window with respect to the opening.

* * * * *